United States Patent
Marshall et al.

(10) Patent No.: US 10,442,626 B2
(45) Date of Patent: Oct. 15, 2019

(54) SNAP-IN DUAL-PRONGED RETAINING DEVICE FOR A CONVEYOR COMPONENT

(71) Applicant: Laitram, L.L.C., Harahan, LA (US)

(72) Inventors: Angela Longo Marshall, Harahan, LA (US); Errol P. Knott, Gonzales, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/892,823

(22) Filed: Feb. 9, 2018

(65) Prior Publication Data

US 2018/0229938 A1 Aug. 16, 2018

Related U.S. Application Data

(60) Provisional application No. 62/458,130, filed on Feb. 13, 2017.

(51) Int. Cl.
*B65G 17/42* (2006.01)
*B65G 17/24* (2006.01)
*B65G 17/08* (2006.01)

(52) U.S. Cl.
CPC .......... *B65G 17/42* (2013.01); *B65G 17/08* (2013.01); *B65G 17/24* (2013.01); *B65G 2207/30* (2013.01); *B65G 2812/02396* (2013.01)

(58) Field of Classification Search
CPC .... B65G 17/42; B65G 17/24; B65G 2207/30; B65G 2812/02396; B65G 17/08; B65G 17/086; B65G 17/38; B65G 17/385; B65G 17/40

USPC .......................................... 198/779, 850–853
See application file for complete search history.

(56) References Cited

U.S. PATENT DOCUMENTS

| | | | | |
|---|---|---|---|---|
| 1,869,050 | A * | 7/1932 | Coppage | B65G 17/086 198/850 |
| 5,960,937 | A * | 10/1999 | Stebnicki | B65G 17/08 198/851 |
| 6,029,802 | A * | 2/2000 | Musiari | B65G 17/08 198/779 |
| 8,225,922 | B1 * | 7/2012 | Fourney | B65G 17/24 198/370.09 |
| 8,978,879 | B2 | 3/2015 | Fourney | |
| 9,494,214 | B2 * | 11/2016 | Morimoto | F16G 13/06 |
| 10,183,809 | B2 * | 1/2019 | Richardson | B65G 17/083 |

(Continued)

FOREIGN PATENT DOCUMENTS

| | | | |
|---|---|---|---|
| EP | 0795496 A1 | 9/1997 | |
| JP | 59194918 A * | 11/1984 | B65G 17/24 |

(Continued)

OTHER PUBLICATIONS

International Search Report and Written Opinion of the International Searching Authority, PCT/US2018/017575, dated May 18, 2018, Korean Intellectual Property Office, Republic of Korea.

*Primary Examiner* — Mark A Deuble
(74) *Attorney, Agent, or Firm* — Catherine M. Bishop

(57) ABSTRACT

A snap-in dual-pronged retaining device for a conveyor component includes two parallel prongs extending from an integral base. The prongs may form axles for rollers, hinge rods for coupling two conveyor belt modules together, or retaining shafts for retaining a component relative to the conveyor belt. A fastener secures the retaining device and conveyor component in place.

14 Claims, 14 Drawing Sheets

(56) References Cited

U.S. PATENT DOCUMENTS

| | | | |
|---|---|---|---|
| 2006/0054472 A1 | 3/2006 | Hall | |
| 2014/0151199 A1* | 6/2014 | Blase | F16G 13/16 198/850 |
| 2014/0159326 A1* | 6/2014 | Copus | B62B 3/02 280/28.5 |
| 2014/0299451 A1* | 10/2014 | Ragan | B65G 17/065 198/850 |
| 2014/0346014 A1* | 11/2014 | Andreoli | B65G 13/02 198/779 |
| 2015/0175357 A1* | 6/2015 | Wolff | B65G 17/42 198/867.09 |
| 2017/0144839 A1* | 5/2017 | Bogle | B65G 17/40 |

FOREIGN PATENT DOCUMENTS

| | | | |
|---|---|---|---|
| JP | 2015040101 A | 3/2015 | |
| WO | WO-2017125873 A1 * | 7/2017 | B65G 17/24 |

* cited by examiner

SNAP-IN DUAL-PRONGED RETAINING DEVICE FOR A CONVEYOR COMPONENT

RELATED APPLICATIONS

The present application claims priority to U.S. Provisional Patent Application No. 62/458,130, filed Feb. 13, 2017, and entitled, "Snap-In Dual-Pronged Retaining Device for a Conveyor Component", the contents of which are herein incorporated by reference.

BACKGROUND OF THE INVENTION

The invention relates generally to power-driven conveyors and more particularly to a retention device for retaining conveyor components together.

Modular plastic conveyor belts are widely used in various industries to convey products. Modular plastic conveyor belts are constructed of a series of rows of side-by-side belt modules. Hinge eyes along opposite ends of each row interleave with hinge eyes of consecutive rows. A hinge rod inserted in the interleaved hinge eyes connects the rows together at hinge joints into an endless conveyor belt loop.

In addition, some conveyor belts integrate rollers or other auxiliary components using rods. For example, the INTRALOX® Series 7050 Dual-Stacked Transverse Roller belt includes a first set of rollers within the body of a conveyor belt module supporting a second set of smaller-diameter rollers that contact and direct product.

SUMMARY OF THE INVENTION

A snap-in dual-pronged retaining device for a conveyor component includes two parallel prongs extending from an integral base. The prongs may form axles for rollers, hinge rods for coupling two conveyor belt modules together, or retaining shafts for retaining a component relative to the conveyor belt. An integral fastener secures the snap-in dual-pronged retaining device in place.

According to one aspect, a retaining device for a conveyor component comprises a substantially planar base, a first prong extending from the base along a first axis, and a second prong extending from the base along a second axis parallel to the first axis.

According to another aspect, a conveyor belt module comprises a body extending longitudinally from a first end to a second end, laterally from a first side edge to a second side edge and in thickness from a top surface to a bottom surface, a pair of rollers coupled to the body using a retaining device having two prongs extending from an integral base, each prong extending through a roller and a lock for securing the retaining device relative to the body.

According to another aspect, a conveyor belt comprises a first module, a second module, a third module and a two-pronged retaining device for coupling the first module, second module and third module together. The first module comprises a body extending longitudinally from a first end to a second end, laterally from a first side edge to a second side edge and in thickness from a top surface to a bottom surface, a plurality of first hinge elements spaced across the first end and a plurality of second hinge elements spaced across the second end. The second module comprises a body extending longitudinally from a first end to a second end, laterally from a first side edge to a second side edge and in thickness from a top surface to a bottom surface, a plurality of third hinge elements spaced across the first end and aligned with the first hinge elements to form a first hinge passageway and a plurality of fourth hinge elements spaced across the second end. The third module comprises a body extending longitudinally from a first end to a second end, laterally from a first side edge to a second side edge and in thickness from a top surface to a bottom surface, a plurality of fifth hinge elements spaced across the first end and aligned with the fourth hinge elements to form a second hinge passageway and a plurality of sixth hinge elements spaced across the second end. The two-pronged retaining device comprises a base seated adjacent the first side edge of the second module, a first prong integrally formed with the base and extending through the first hinge passageway and a second prong integrally formed with the base and extending through the second hinge passageway.

BRIEF DESCRIPTION OF THE DRAWINGS

These aspects and features of the invention, as well as its advantages, are described in more detail in the following description, appended claims, and accompanying drawings, in which:

DETAILED DESCRIPTION

A snap-in dual-pronged retaining device for a portion of a conveyor includes two parallel prongs extending from an integral base member. The prongs may be roller axles, hinge rods or any type of axles, shaft, rod, bar or the like used to retain one or more components, such as rollers, in a conveyor. The invention will be described relative to certain illustrative embodiments, though one skilled in the art will recognize that the invention is not limited to these illustrative embodiments.

Figure 1:
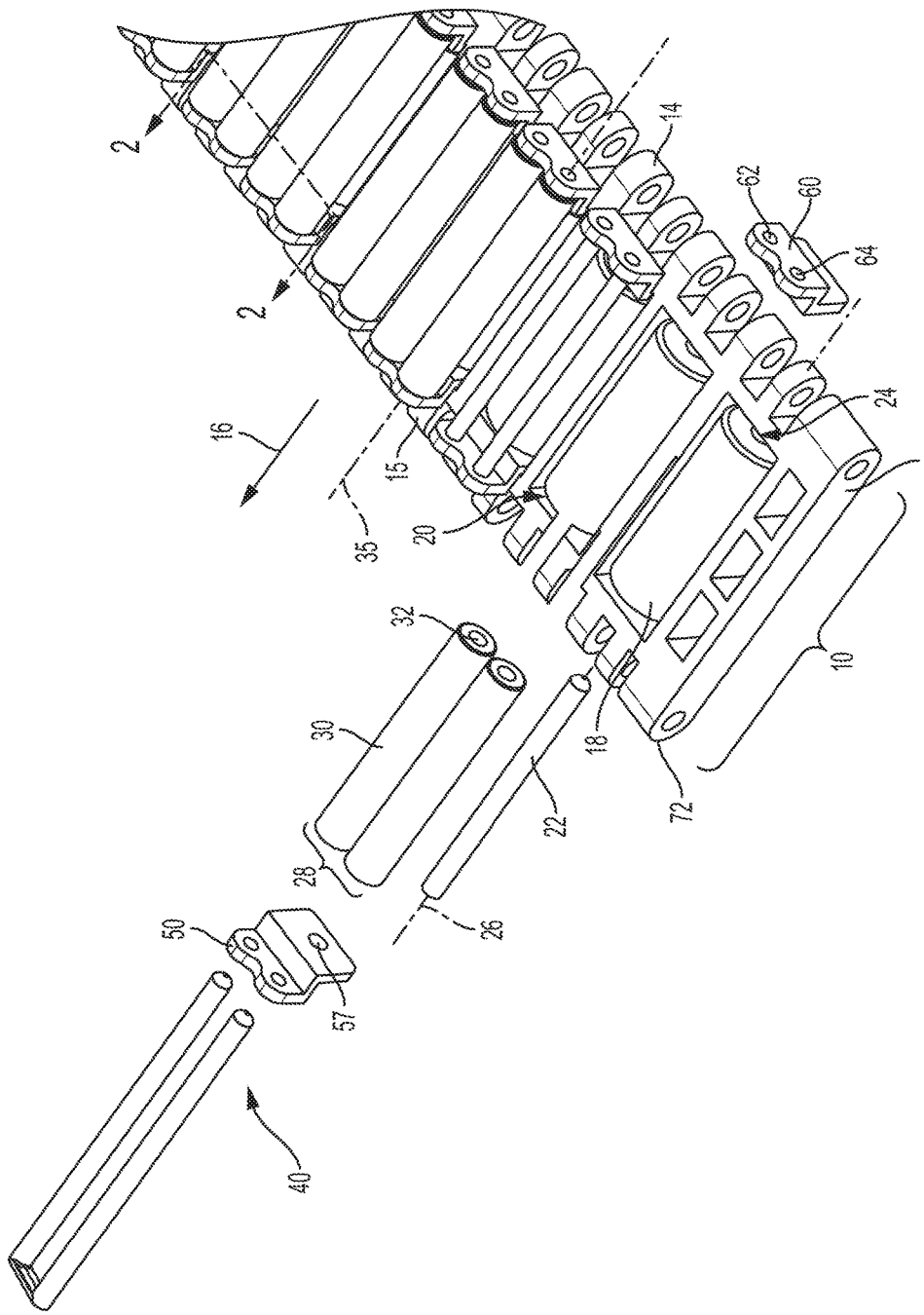
FIG. 1 is an isometric view of a portion of a conveyor belt module employing two-pronged retention device of an embodiment of the invention.

A portion of one row of a modular conveyor belt employing a snap-in dual-pronged retaining device having features of the invention is shown in FIG. 1. The illustrative belt row 10 comprises one or more belt modules 12 arranged side by side. Each module extends from a first end 14 to an opposite second end 15 in a direction of belt travel 16 and includes a plurality of hinge elements 72 extending from the first and second ends. Belt rollers 18 reside in cavities 20 formed in the belt module between the first and second ends. An axle 22 extending through a bore 24 in each belt roller defines an axis of rotation 26 for the belt roller. The axis of rotation 26 is parallel to the direction of belt travel 16. The axles of all the belt rollers 18 in the belt row 10 lie in a common plane.

Mounted atop each belt roller 18 is a pair 28 of article-supporting rollers 30. The illustrative article-supporting rollers are longer than the belt rollers 18 to provide more contact with a conveyed product, but the invention is not so limited, and the article-supporting rollers and belt rollers can have any suitable size and length. Because there are more article-supporting rollers 30 than belt rollers 18, the article-supporting rollers provide more contact area for conveyed articles than would the belt rollers 18 in a belt without the pairs of article-supporting rollers 30. The peripheries of the rollers contacting each other may be made of high-friction materials for good engagement. The article-supporting rollers alternatively can be made of materials producing a low-friction or durable periphery.

Figure 2:
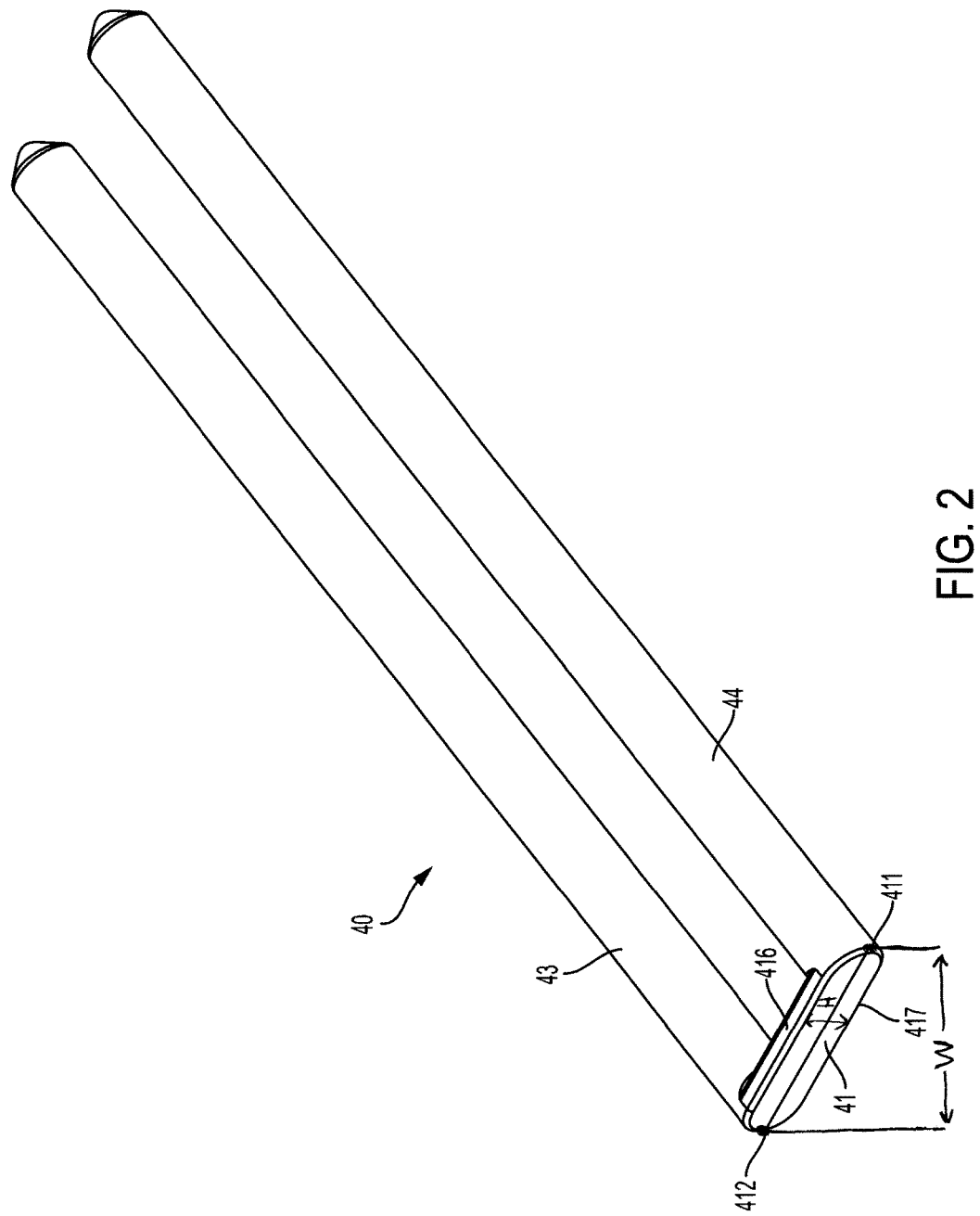
FIG. 2 is an isometric view of the two-pronged retention device of FIG. 1.
Figure 3:
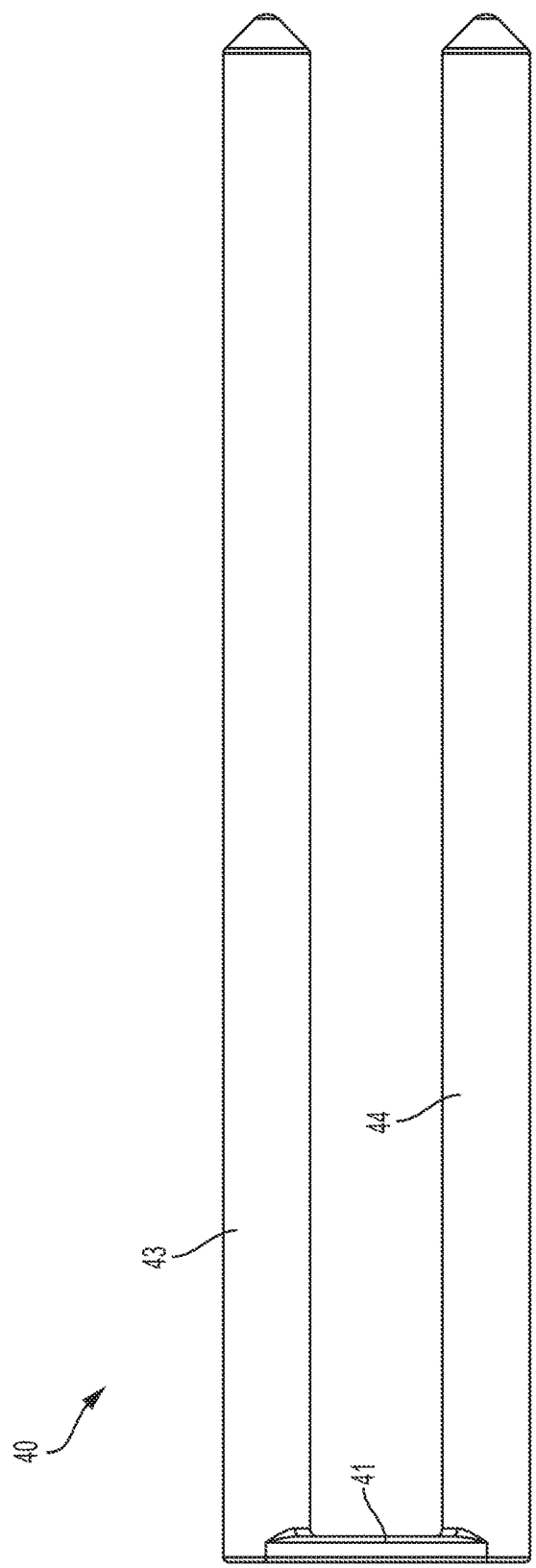
FIG. 3 is a top view of the two-pronged retention device of FIG. 2.

Each pair 28 of article-supporting rollers 30 is supported by a snap-in dual-pronged retaining device 40, an embodiment of which is shown in FIGS. 2 and 3. Each snap-in dual-pronged retaining device 40 includes a substantially planar base 41 from which extend two parallel prongs forming axles 43, 44. The axles 43, 44 extend through bores 32 in the article-supporting rollers 30 and define the axes of rotation of the article-supporting rollers 30. The axes of rotation of the article supporting rollers are parallel to the axes 26 of the belt rollers 18. The illustrative axles 43, 44 have tapered tips, though the invention is not so limited. The axles have circular cross-sections, though the invention is not so limited.

The base 41 has an obround shape (shaped like a racetrack), with the curved side edges 411, 412, forming semi-circles extending tangent to and connecting a top edge 416 to a bottom edge 417. The curved side edges 411, 412 coincide with and share the same curve as the outer side surfaces of the axles 43, 44, so that the axles extend to and intersect the side surfaces 411, 412. The diameter of each axle 43, 44 is equal to the height H of the base 41 and the outermost sides of the axles 43, 44 are separated by a distance equal to the width W of the base 41. The top and bottom edges 416, 417 are straight.

Figure 4:
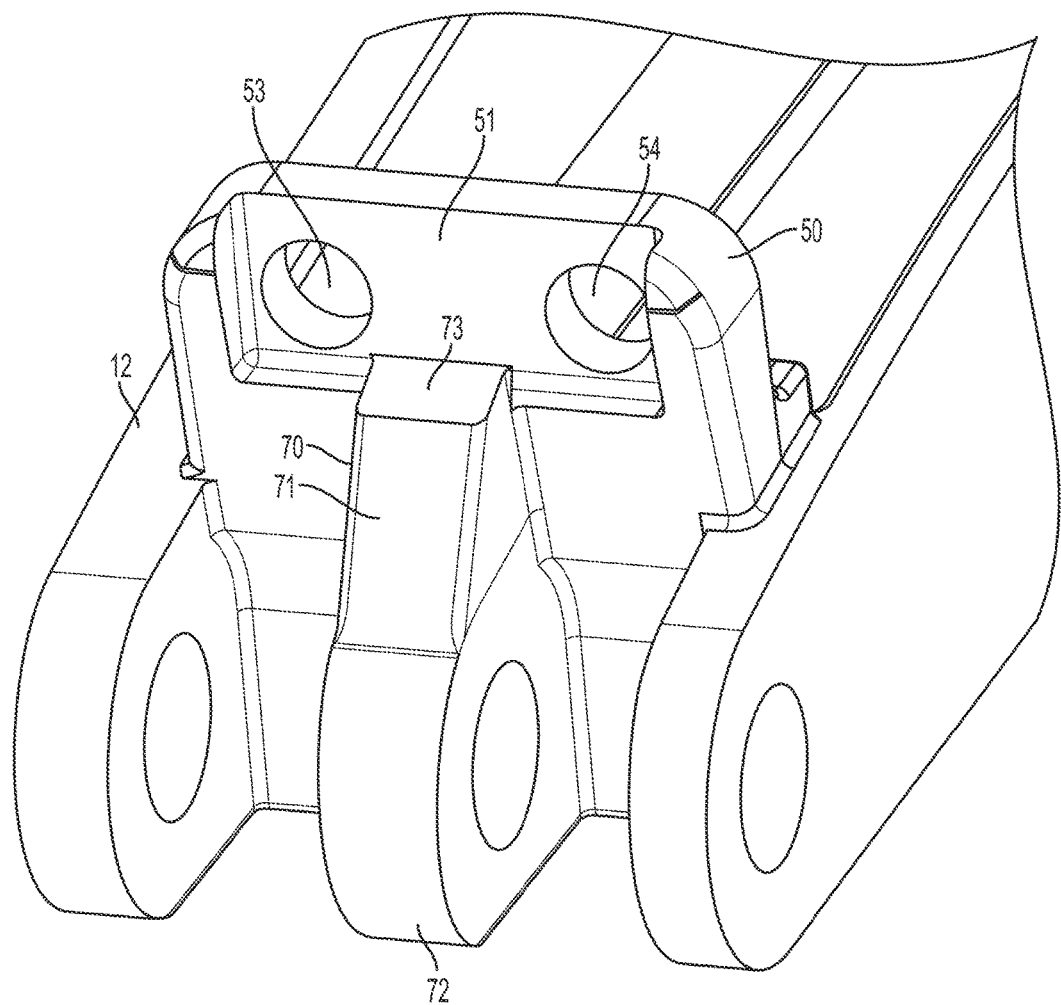
FIG. 4 is an isometric view of a conveyor belt module suitable for receiving a two-pronged retention device.
Figure 5:
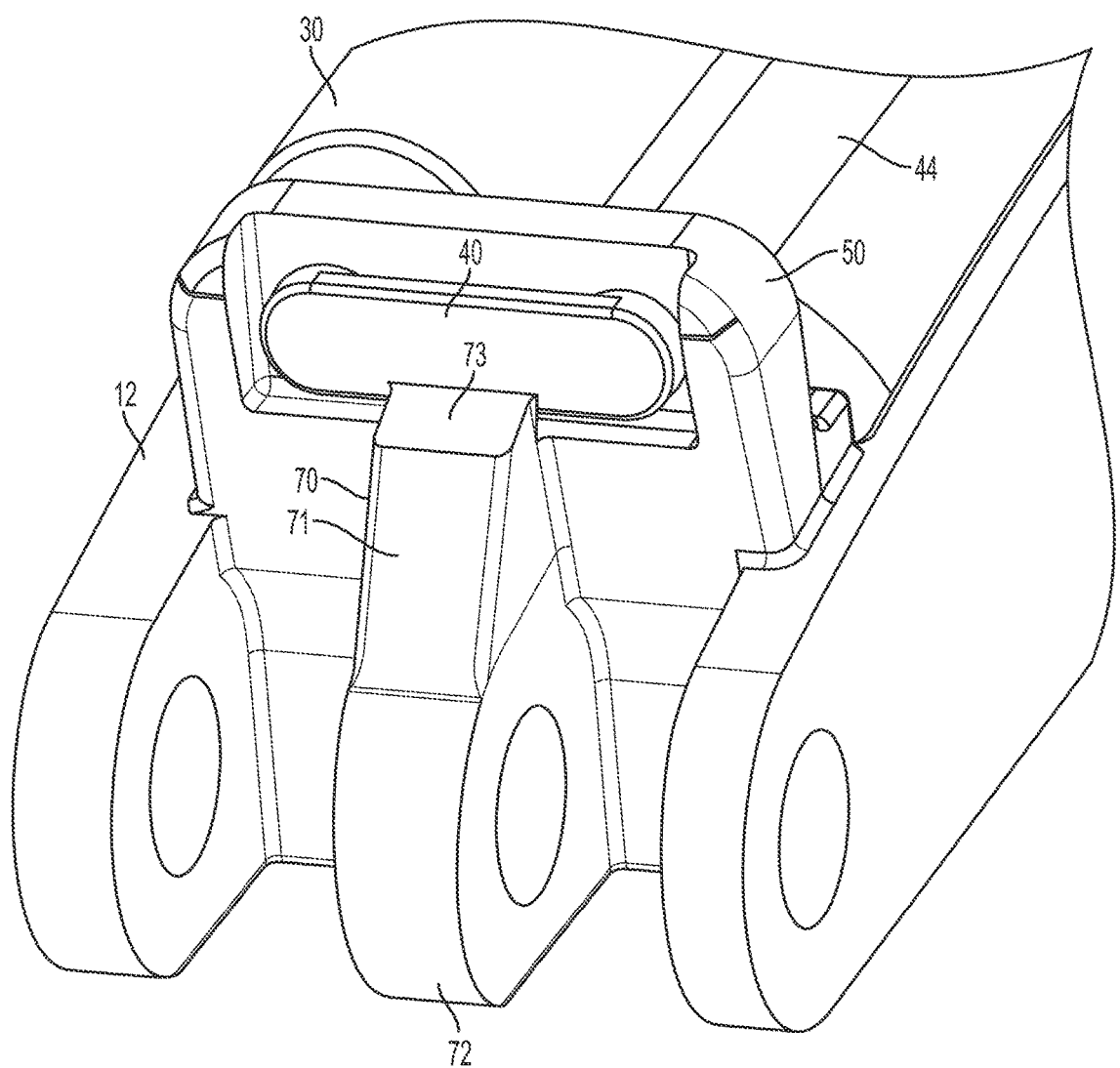
FIG. 5 shows the conveyor belt module of FIG. 4 with the two-pronged retention device of FIG. 2 inserted therein to retain a roller.
Figure 6:
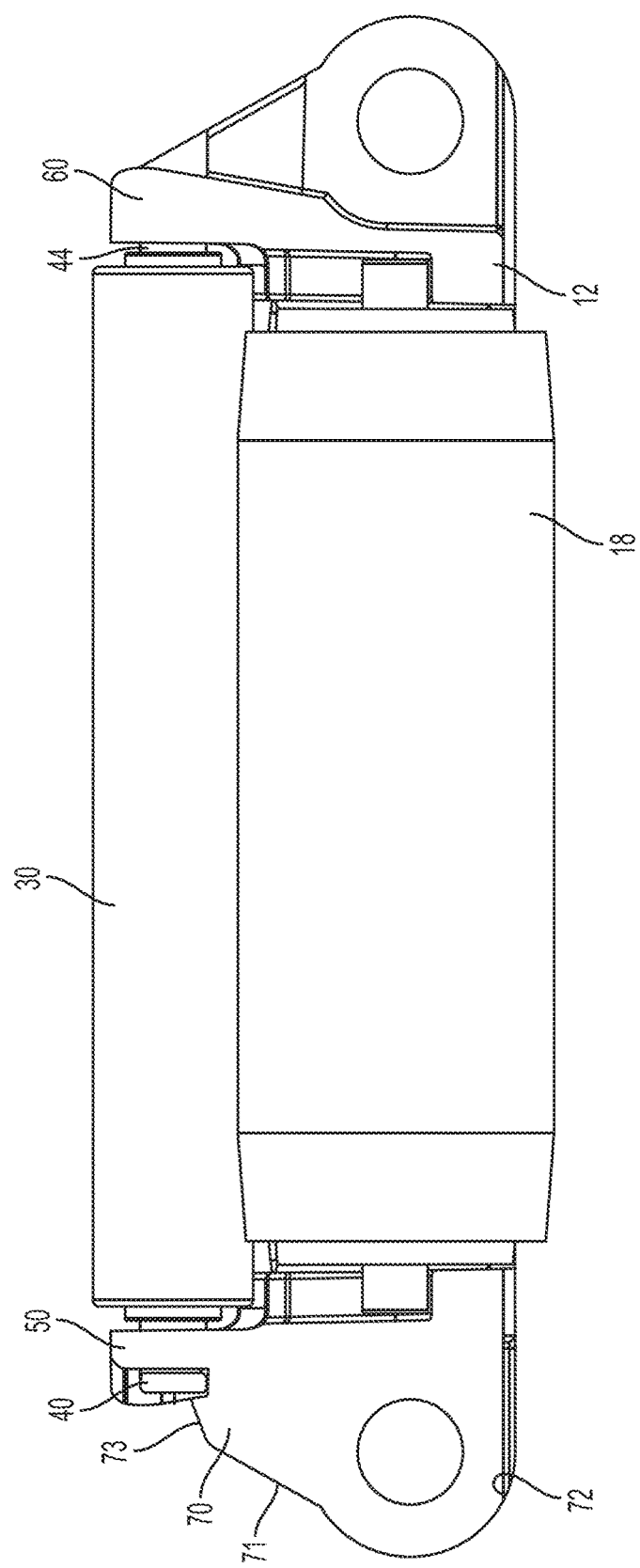
FIG. 6 is a side view of the module of FIG. 5.

Referring to FIGS. 1, 4, 5 and 6, the module 12 includes a seat 51 for receiving the snap-in dual-pronged retaining device 40. The seat 51 is formed in a stanchion 50 extending up from the body of the conveyor belt module. The illustrative module includes two stanchions 50, 60 on each end of each cavity 20. A first stanchion 50, which seats the base 41 includes a recess 51 in an outer surface sized and configured to receive the base. The stanchion 50 also includes two openings 53, 54 for receiving each axle 43, 44. The stanchion 50 may be integral with the module body, as shown in FIGS. 4, 5 and 6, or comprise a separate insert, as shown in FIG. 1. The insert stanchion in FIG. 1 further includes an opening 57 for receiving the axle 22 of a lower roller 18.

The module 12 further includes a fastener for securing the dual-pronged retaining device 40. Alternatively, the fastener may be integral with the dual-pronged retaining device 40 or partially on either component. In the embodiment of FIGS. 1-6, the fastener comprises a protrusion 70 extending up from a hinge element 72 below the stanchion. The protrusion 70 serves to lock the base 41 of the retainer 40 in the recess 51. The illustrative protrusion 70 has a slanted front surface 71 though the invention is not so limited. A ramp 73 at the top of the slanted front face facilitates insertion of the base 41 in the recess 51. The illustrative ramp 73 extends at about 20° relative to the horizontal. When locked in the recess 51, the protrusion 70 overlaps the base of the retaining device 40. The invention is not limited to the illustrative fastener, and any suitable means for securing the retaining device in place may be used. For example, the fastener may comprise a hook, protrusion, recess, opening, barb, groove, or other suitable device on the module, retaining device and-or the component to be retained, such as a roller.

The ends of the axles 43, 44 extend into openings 62, 64 formed in the second stanchion 60 on the opposite end of the module. The axle ends may be press-fit into the openings 62, 64, but the invention is not so limited.

The axles 43, 44 can be acetal, corrosion-resistant, plain, or hardened steel, for example, or any suitable material or combination of materials. In one embodiment, the dual-pronged retention device 40 is injection molded plastic.

In one embodiment, the dual-pronged retaining device 40 can be rotated 90° and used to retain rollers or other components that are stacked vertically.

A dual-pronged retention device 40 can be used for other applications not limited to the embodiment shown in FIGS. 1-6.

Figure 7:
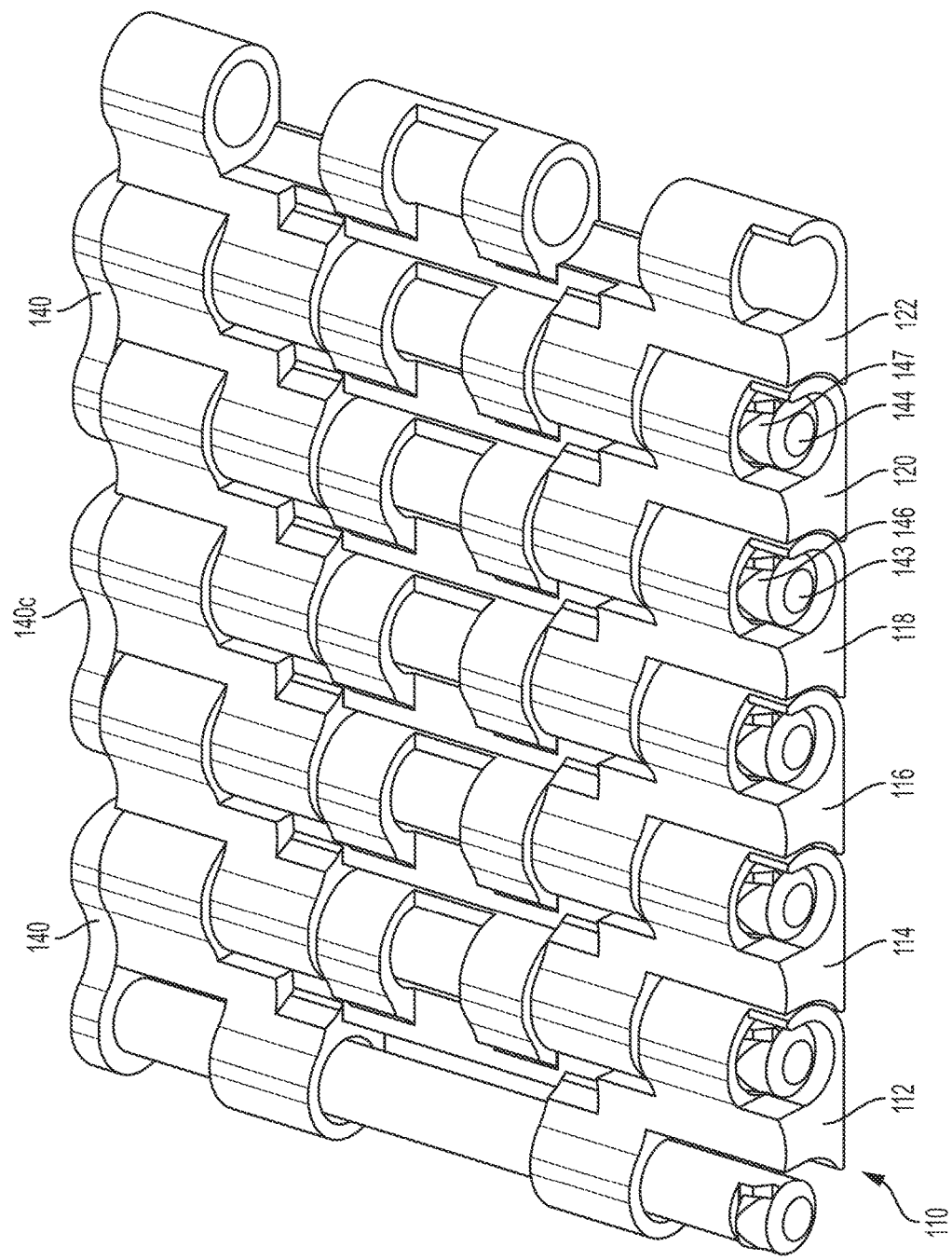
FIG. 7 is an isometric view of a portion of a conveyor belt employing a two-pronged retention device according to another embodiment of the invention.
Figure 8:
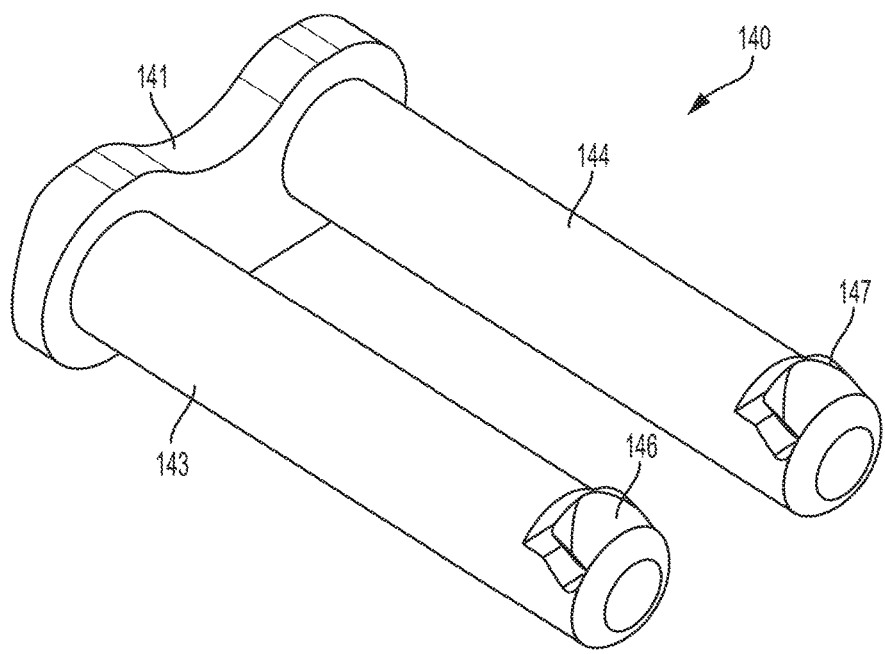
FIG. 8 is an isometric view of the two-pronged retention device of FIG. 7.
Figure 9:
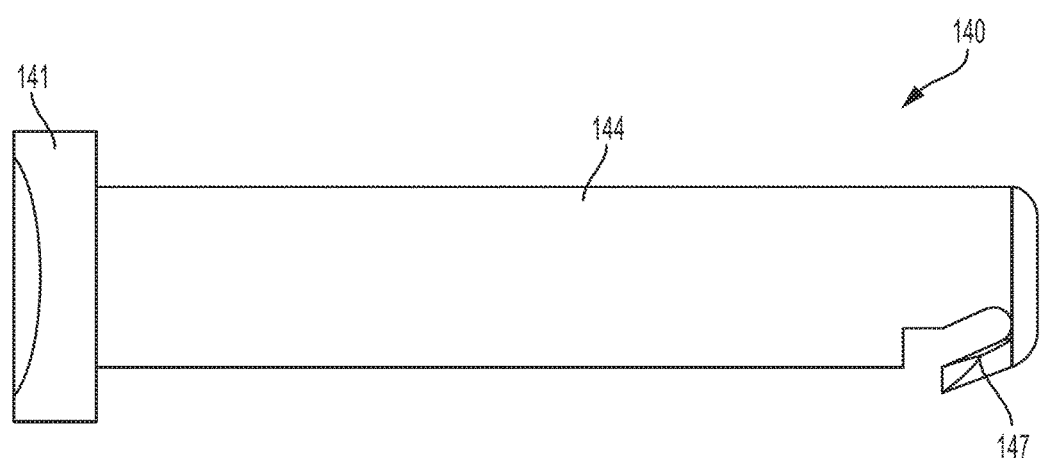
FIG. 9 is a side view of the two-pronged retention device of FIG. 8.

For example, as shown in FIG. 7-9, dual-pronged retention devices 140 may be used as hinge pins, linking modules 112, 114, 116, 118, 120, 122 together in a conveyor belt 110. For example, a central dual-pronged retaining device 140c may link modules 114 and 116 together using a first axle 143 and modules 116, 118 together using a second axle 144. Each dual-pronged retention device 140 comprises a base 141 from which extend two parallel axles 143, 144 forming hinge rods. The hinge rods 143, 144 are inserted through aligned hinge openings of adjacent modules to link the modules together, with the base 141 sitting flush against a first side of the linked modules, spanning an entire module length. The axles 143, 144 may each include a retention barb 146, 147 or other feature for fastening the retention device relative to the modules. The retention barbs 146, 147 hook onto an edge of the module to lock the retaining device in place, though other suitable locking mechanisms may be used.

Figure 10:
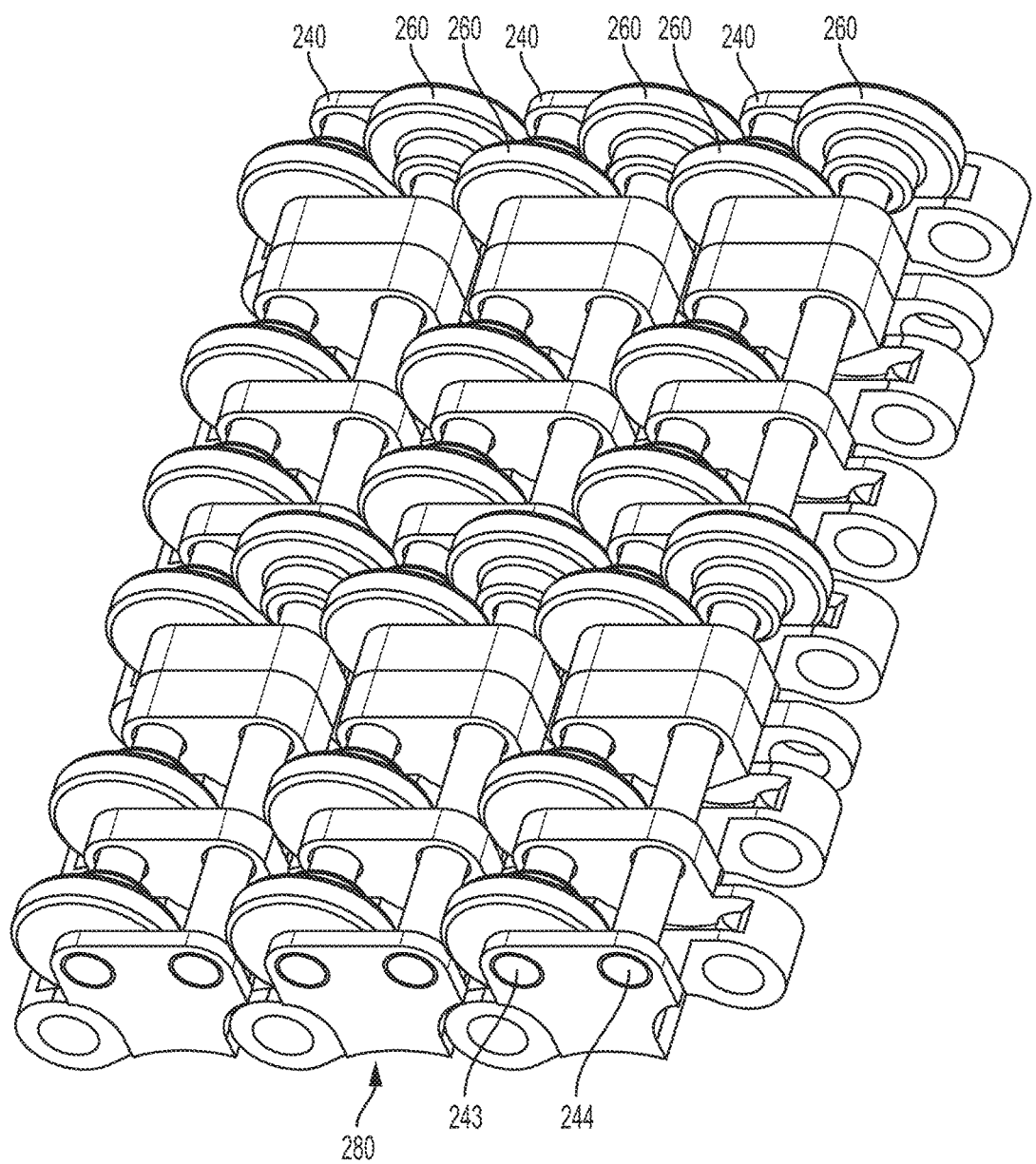
FIG. 10 shows a portion of a conveyor belt employing a two-pronged retention device according to another embodiment of the invention.

In another embodiment, shown in FIG. 10, dual-pronged retention devices 240 with parallel prongs 243, 244 extending from an integral base may be used to retain staggered rollers 260 in a conveyor belt 280.

Figure 11:
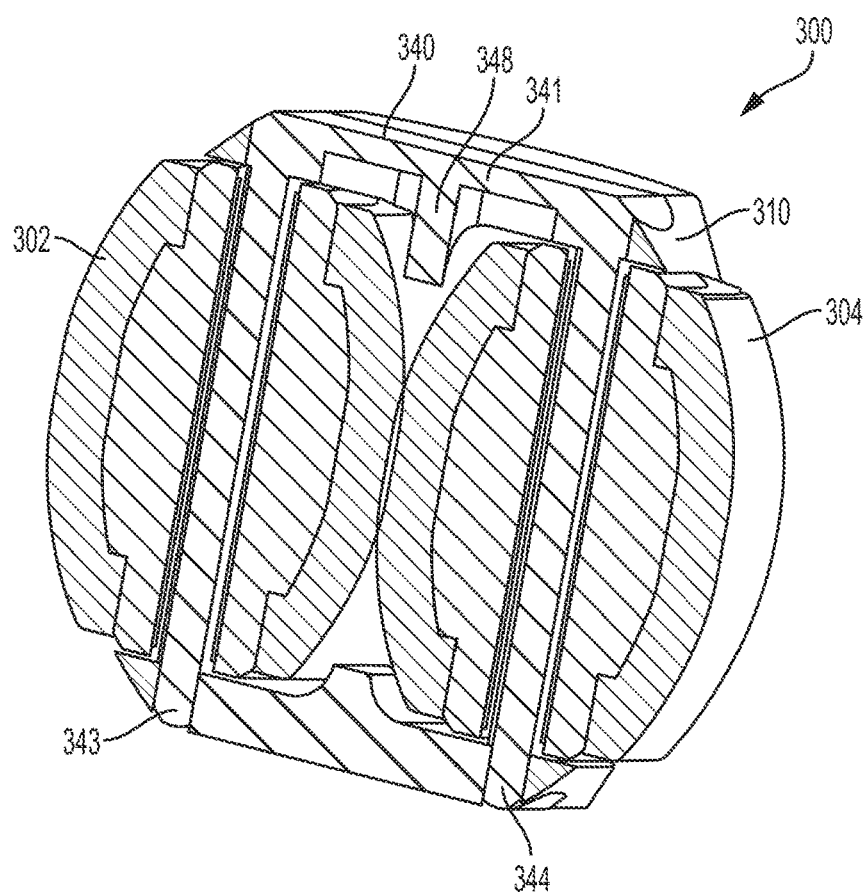
FIG. 11 is a cross-sectional view of a multi-directional roller assembly that employs a two-pronged retention device according to another embodiment of the invention.
Figure 12:
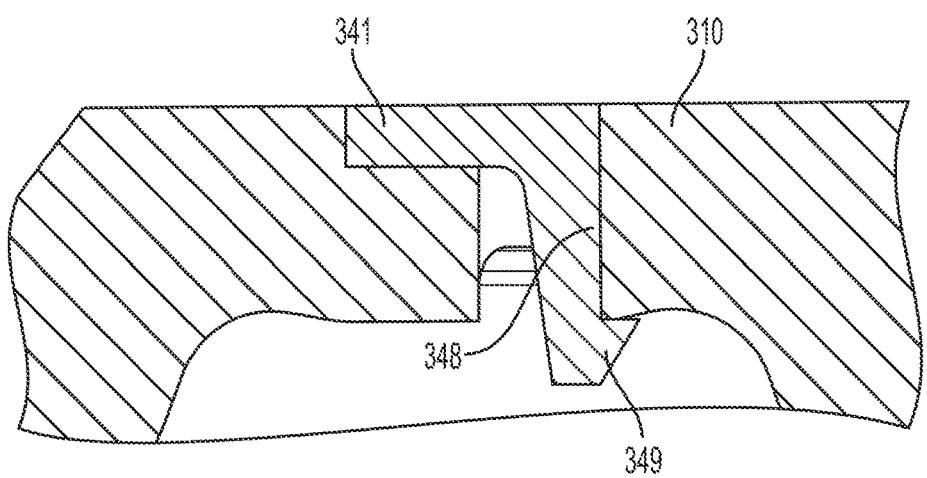
FIG. 12 is a close-up view of the base portion of the two-pronged retention device of FIG. 11 when latched onto the multi-directional roller assembly.

In another application, shown in FIGS. 11 and 12, a dual-pronged retention device 340 may be used in a multi-directional roller assembly 300, such as the multi-directional roller assembly described in U.S. Pat. No. 8,979,879, issued Mar. 15, 2015, the contents of which are herein incorporated by reference. The dual-pronged retention device 340 can form axles for mounting the mutually-actuating rollers 302, 304 in the assembly 300 and maintaining the positions of the rollers relative to each other and relative to the frame 310 of the assembly.

The dual-pronged retention device 340 comprises a base 340 from which axles 343, 344 extend. The axles 343, 344 may be parallel to each other. The base 341 is seated in a seat in the frame 310. A fastener, shown as a latch 348, extends from a central portion of the base 341 for securing the device 340 to the frame 310. As shown in FIG. 12, the latch 348 includes a flexible barb 349 that engages an edge in the frame to secure the device in place.

Figure 13:
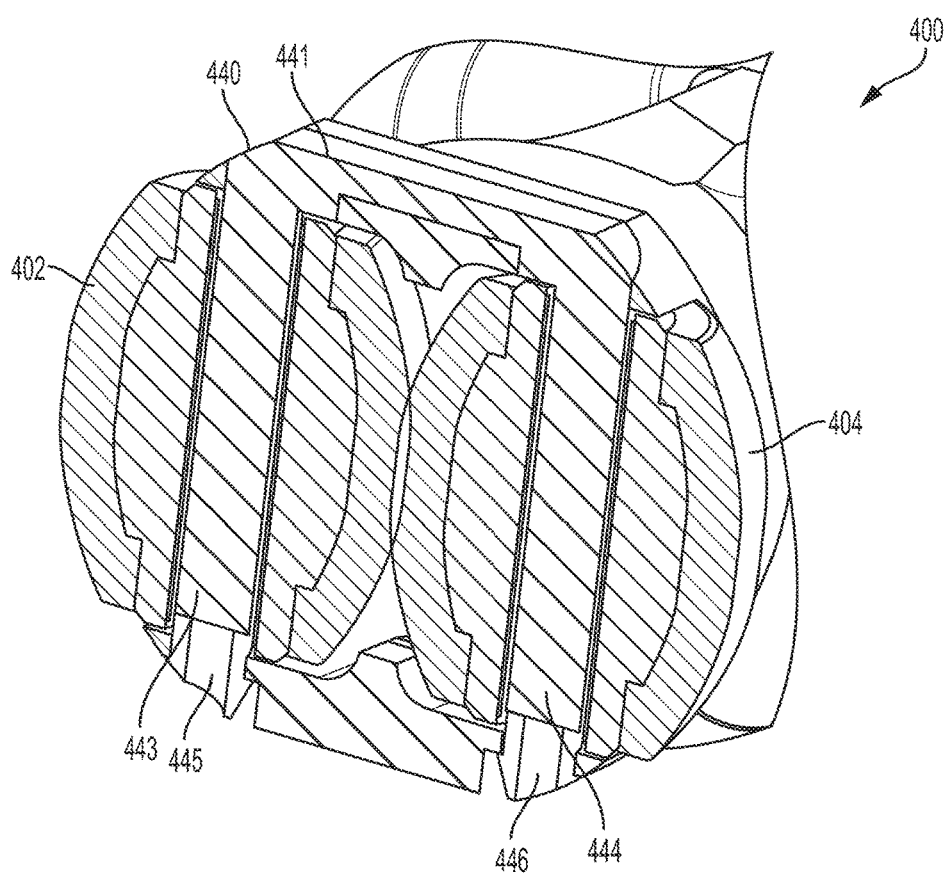
FIG. 13 is a cross-sectional view of a multi-directional roller assembly that employs a two-pronged retention device according to another embodiment of the invention.
Figure 14:
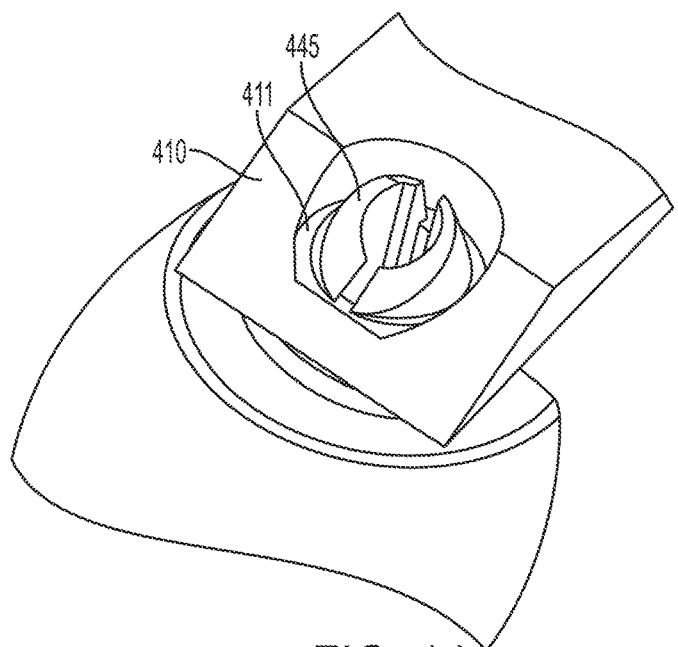
FIG. 14 is a detailed view of the tip of an axle of the two-pronged retention device of FIG. 13.

In another embodiment, shown in FIG. 13, a dual-pronged retention device 440 for a multi-directional roller assembly 400 includes a base 441 seated in a seat and axles 443, 444 extending from the base for mounting rollers 402, 404. The tips 445, 446 of the axles 443, 444 are split to form flexible, compressible legs. The tips 445, 446 compress to pass through a retaining opening 411 in the frame 410, then pop open to retain the dual-pronged retention device 440 in place, as shown in FIG. 14.

Figure 15:
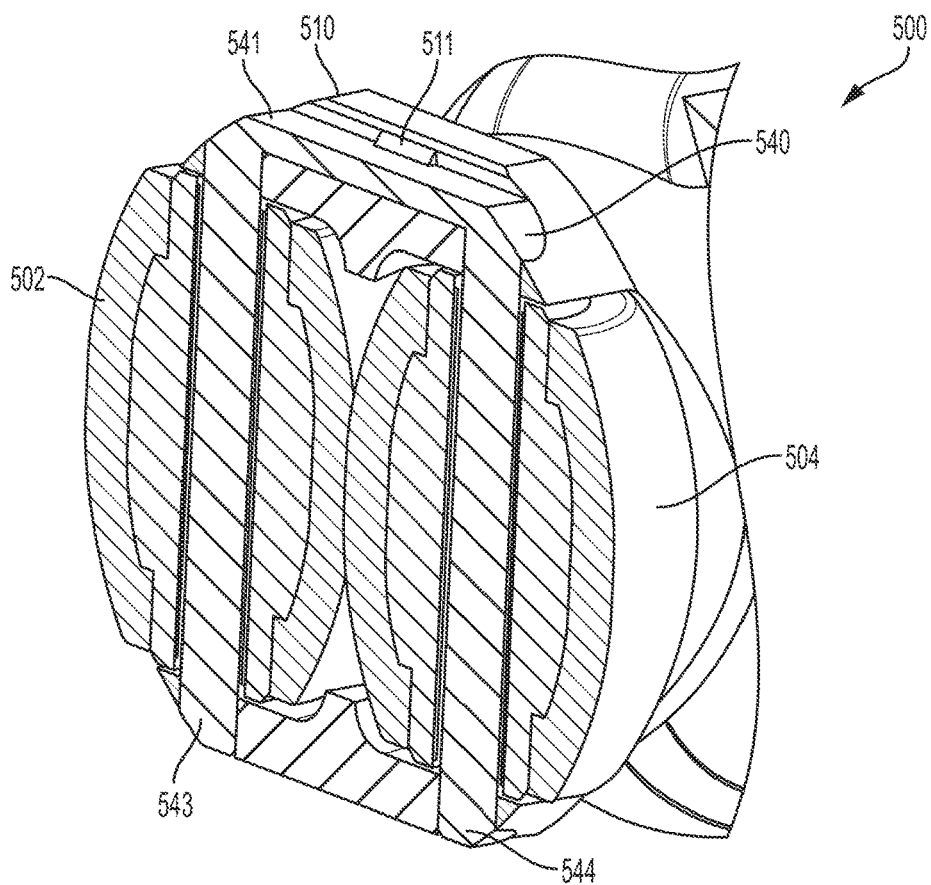
FIG. 15 is a cross-sectional view of a multi-directional roller assembly that employs a two-pronged retention device according to another embodiment of the invention.
Figure 16:
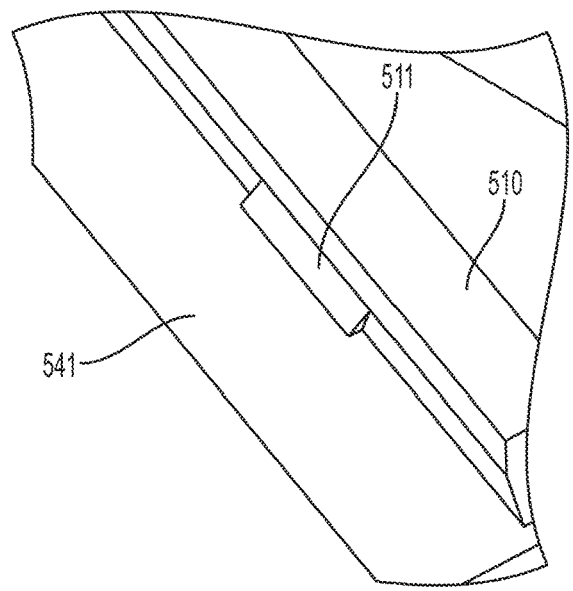
FIG. 16 is a detailed view of a retention feature in the multi-directional roller assembly of FIG. 15.

In another embodiment, shown in FIG. 15, a dual-pronged retention device 540 for a multi-directional roller assembly 500 includes a base 541 seated in a seat in a frame 510 of the multi-directional roller assembly and axles 543, 544 extending from the base 541 for mounting rollers 502, 504. As shown in FIG. 16, a protrusion 511 in the frame 510 can engage the base to lock the retention device in place.

Figure 17:
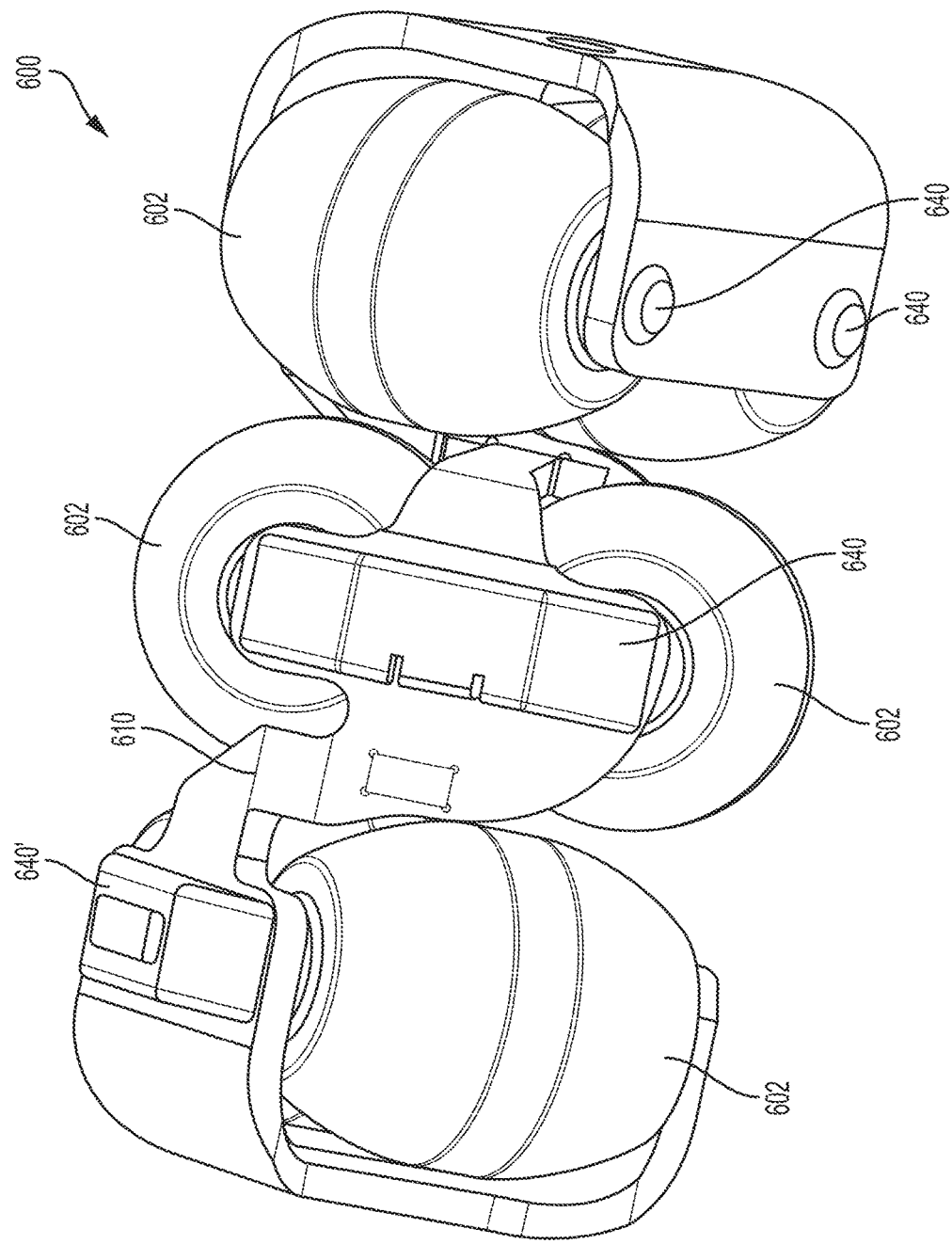
FIG. 17 is an isometric view of a multi-directional roller assembly employing two-pronged retention devices according to another embodiment of the invention.
Figure 18:
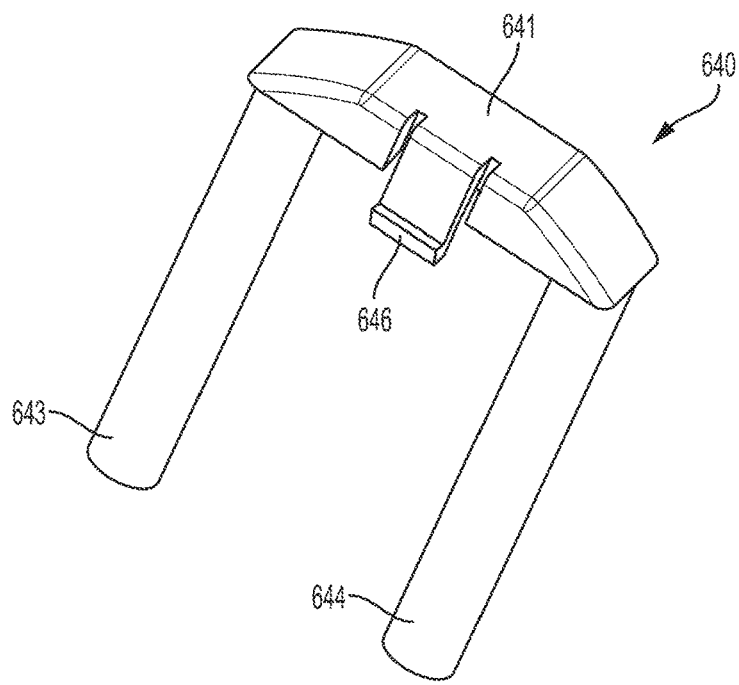
FIG. 18 is an isometric view of a two-pronged retention device of FIG. 17.
Figure 19:
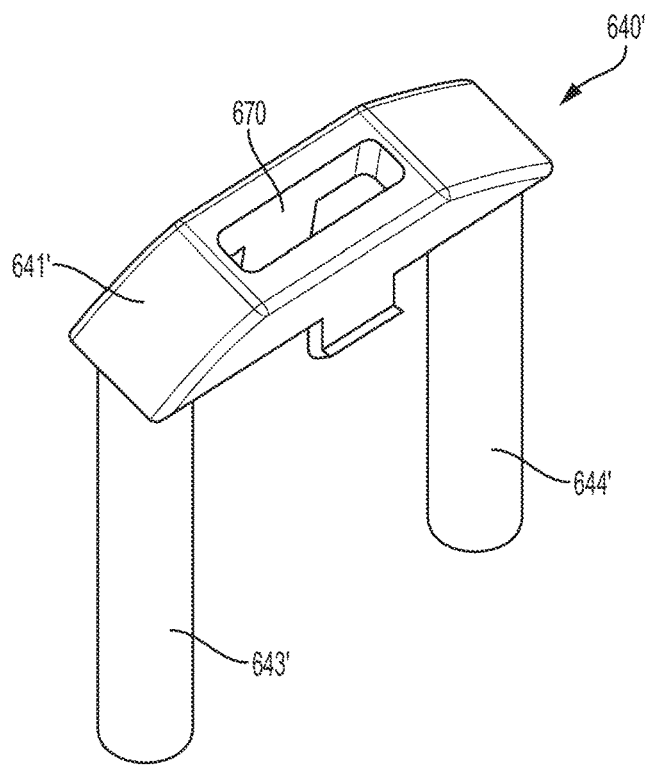
FIG. 19 is an isometric view of another two-pronged retention device of FIG. 17.

FIG. 17 shows another embodiment of a multi-directional roller assembly 600 including self-retaining dual-pronged retention devices holding pairs of mutually-actuating rollers 602 relative to a frame 610. A first retention device 640, shown in FIG. 18, comprises a base 641 from which parallel axles 643, 644 extend. One or more flexible retention barbs or tabs 646 extend from the base 641. The frame 610 of the multi-directional roller assembly 600 includes a feature in the frame 610 for engaging the flexible retention tab 646 to hold the retention device 640 in place. In another embodiment, shown in FIG. 19, a dual-pronged retention device 640' may include an opening 670 in the base 641'.

The invention is not limited to a retention device with two prongs, and the device may alternatively include three or more prongs extending from an integral base to secure components of a conveyor.

Although the invention has been described in detail with respect to an exemplary version, other versions are possible. So, as these few examples suggest, the scope of the claims is not meant to be limited to the exemplary embodiments described in detail.

What is claimed is:

1. A retaining device for a conveyor component, comprising:
   a substantially planar base having a first curved side edge and a second curved side edge opposite the first curved side edge;
   a first prong extending from the base along a first axis, the first prong having a side surface that coincides with the first curved side surface of the base;
   a second prong extending from the base along a second axis parallel to the first axis, the second prong having a side surface that coincides with the second curved side surface of the base; and
   a fastener comprising a retention barb for securing the retaining device relative to a conveyor component.

2. The retaining device of claim 1, wherein each prong has a substantially round cross-section.

3. The retaining device of claim 1, wherein the diameter of each prong is equal to the height of the base.

4. The retaining device of claim 1, wherein the base has an obround shape.

5. The retaining device of claim 1, wherein the first prong, second prong and base are integrally formed by injection molding.

6. The retaining device of claim 1, wherein the base, first prong and second prong are formed of acetal.

7. The retaining device of claim 1, wherein the retention barb is formed on an end of the first prong or the second prong.

8. A conveyor belt module, comprising:
   a body extending longitudinally from a first end to a second end, laterally from a first side edge to a second side edge and in thickness from a top surface to a bottom surface, the body further including a first stanchion extending up from the top surface, the first stanchion including a recess and two openings;
   a pair of rollers coupled to the body using a retaining device having two prongs extending from an integral base received in the recess of the first stanchion, each prong extending through an opening of the first stanchion and through a roller; and
   a lock for securing the retaining device relative to the body.

9. The conveyor belt module of claim 8, wherein the lock includes a protrusion for securing the base of the retaining device in the recess.

10. The conveyor belt module of claim 9, wherein the protrusion extends up from a hinge element extending from the body and overlaps the recess.

11. The conveyor belt module of claim 10, wherein the protrusion has a slanted front face and a top ramp to facilitate insertion of the base into the recess.

12. The conveyor belt module of claim 9, further comprising a second stanchion extending up from the top surface for receiving the ends of the two prongs on the retaining device.

13. The conveyor belt module of claim 8, further comprising a cavity in the body housing a bottom roller, with the pair of rollers parallel to and on top of the bottom roller.

14. A retaining device for a conveyor component, comprising:
   a substantially planar base having a straight top edge, a straight bottom edge, a first curved side edge forming a semicircle extending tangent to and connecting the straight top edge to the straight bottom edge and a second curved side edge opposite the first curved side edge, the second curved side edge forming a semicircle extending tangent to and connecting the straight top edge to the straight bottom edge;
   a first prong having a circular cross-section extending from the base along a first axis, the first prong having a side surface that coincides with the first curved side surface of the base; and
   a second prong having a circular cross-section extending from the base along a second axis parallel to the first axis, the second prong having a side surface that coincides with the second curved side surface of the base, wherein each prong has a diameter equal to the height of the planar base.

* * * * *